FIP8102 XR 2,779,868

CROSS REFERENCE [redacted]

(1)

Jan. 29, 1957 W. F. RUST, JR 2,779,868

RADIO TRANSMITTER REMOTE CONTROL SYSTEM

Filed Nov. 18, 1953 3 Sheets-Sheet 1

INVENTOR.
WILLIAM F. RUST, JR
BY John J. Rogan
ATTORNEY

Jan. 29, 1957 W. F. RUST, JR 2,779,868

RADIO TRANSMITTER REMOTE CONTROL SYSTEM

Filed Nov. 18, 1953 3 Sheets-Sheet 2

INVENTOR.
WILLIAM F. RUST, JR.
BY John J. Rogan
ATTORNEY

Jan. 29, 1957 W. F. RUST, JR 2,779,868

RADIO TRANSMITTER REMOTE CONTROL SYSTEM

Filed Nov. 18, 1953 3 Sheets-Sheet 3

INVENTOR.
WILLIAM F. RUST, JR.
BY John J. Rogan
ATTORNEY

United States Patent Office 2,779,868
Patented Jan. 29, 1957

2,779,868

RADIO TRANSMITTER REMOTE CONTROL SYSTEM

William F. Rust, Jr., Goffstown, N. H.

Application November 18, 1953, Serial No. 392,911

20 Claims. (Cl. 250—17)

This invention relates to radio transmitters and more especially it relates to the operation of so-called locally unattended radio transmitters.

A principal object of the invention is to provide an improved system for remotely checking and controlling the operating conditions or settings of the various adjustable units of a radio transmitter.

Another object is to provide a remote control device for a radio transmitter whereby at the remote point, for example at a radio studio, an attendant can expeditiously and automatically select for checking and control purposes, any desired unit of the radio transmitter, and in such a way that a continuous indication is given at the studio of the effect of the variations of the selected unit as it is being remotely adjusted or set.

Another object is to provide a remote control system for a radio transmitter whereby at a remote point, for example at a studio, an attendant can select a particular unit of the transmitter to be checked and adjusted, by dialing a number allocated to that particular unit. The system is so arranged that in order to adjust the selected unit, a raise-lower switch arrangement is provided at the studio which is common to all the units of the transmitter to be controlled. As a result there is a minimum chance for error in the controlling and adjusting operations since no improper operation can result from merely dialing the wrong number. The actual tuning, controlling or other movement of the distant unit requires a single dialing operation and the operation of the raise-lower switch device.

A feature of the invention relates to an improved remote control system for a radio transmitter whereby any one of a comparatively large number of units of the transmitter can be rapidly selected for checking and adjustment, the actual adjustment being continuously indicated by a single meter at the controlling point, for example at a radio studio, and wherein the meter can be calibrated from the studio. This avoids errors which might otherwise be introduced by resistance changes caused by temperature variation and the like in the control lines connecting the studio and transmitter.

A further feature relates to a simplified remote control system for a radio transmitter, employing two direct current circuits between the control point and the radio transmitter. Each of these circuits may be a conventional telephone pair, and the selection and adjustment of the various telephone units is effected by a direct current control. This increases the reliability of the system, and enables a direct metallic control to be provided thus eliminating transformers, amplifiers and their associated costly circuits.

A still further feature relates to an improved remote control system for a radio transmitter employing automatic controlled multi-position switches such as step-by-step telephone switches which can be selectively operated from a studio or the like to select any particular unit of a distant transmitter for checking and adjustment. The system also provides an additional control effective in one setting of the said automatic switches to enable the studio to standardize the checking conditions so as to eliminate any false adjustments which might occur as a result of line resistance variations and the like.

A still further feature relates to the novel organization, arrangement and relative interconnection of parts which cooperate to provide an improved, simplified, and reliable remote control system for radio transmitters and the like.

Other features and advantages not particularly enumerated will be apparent after a consideration of the following detailed descriptions and the appended claims.

Figure 1:
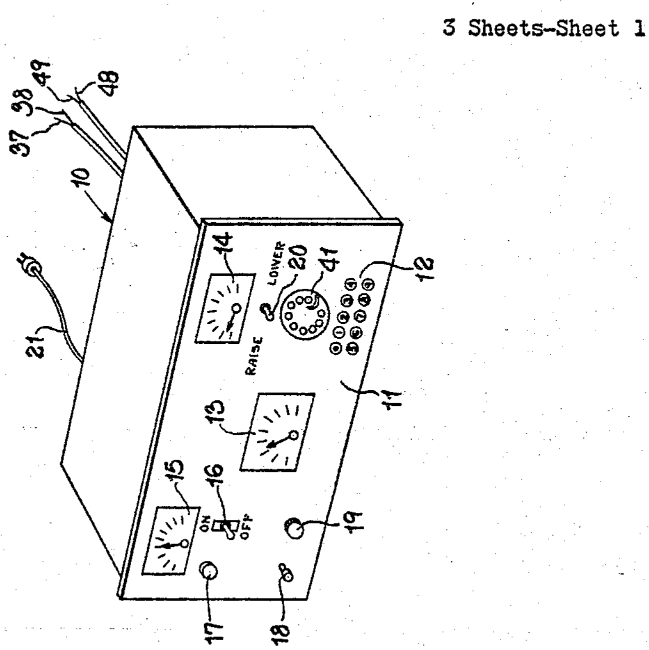
Fig. 1 is a perspective view of the control unit located at the controlling point or studio.

Referring to Fig. 1, the control unit at the studio or other control point, may be housed in a suitable receptacle or box 10 having a front control panel 11. This panel carries a series of ten indicator lamps 12, each carrying its respective digital designation 0–9. Also mounted on the panel 11 is a micro-ammeter 13 of any well-known construction. An additional meter 14 may be provided for indicating percent modulation from the transmitter, and an additional meter 15 may be provided for indicating frequency deviation of the transmitter carrier. "On-off" switch 16 is also mounted on the panel, as well as an indicating lamp 17 which is illuminated when the control power is on. An additional push-button switch 18 may be provided to connect the micro-ammeter 13 in circuit for checking purposes as will be described. A potentiometer control knob 19 is also provided for adjusting the standardizing potentiometer to be described. A two-position toggle switch 20 is also mounted on the panel and controls the "lower-raise" conditions to be described hereinbelow. The unit 10 may be provided with a suitable power line cord 21 for plugging into any standard 110 volt A. C. power line. Throughout the various figures of the drawing, the identical parts bear the same designation numerals.

Figure 2:
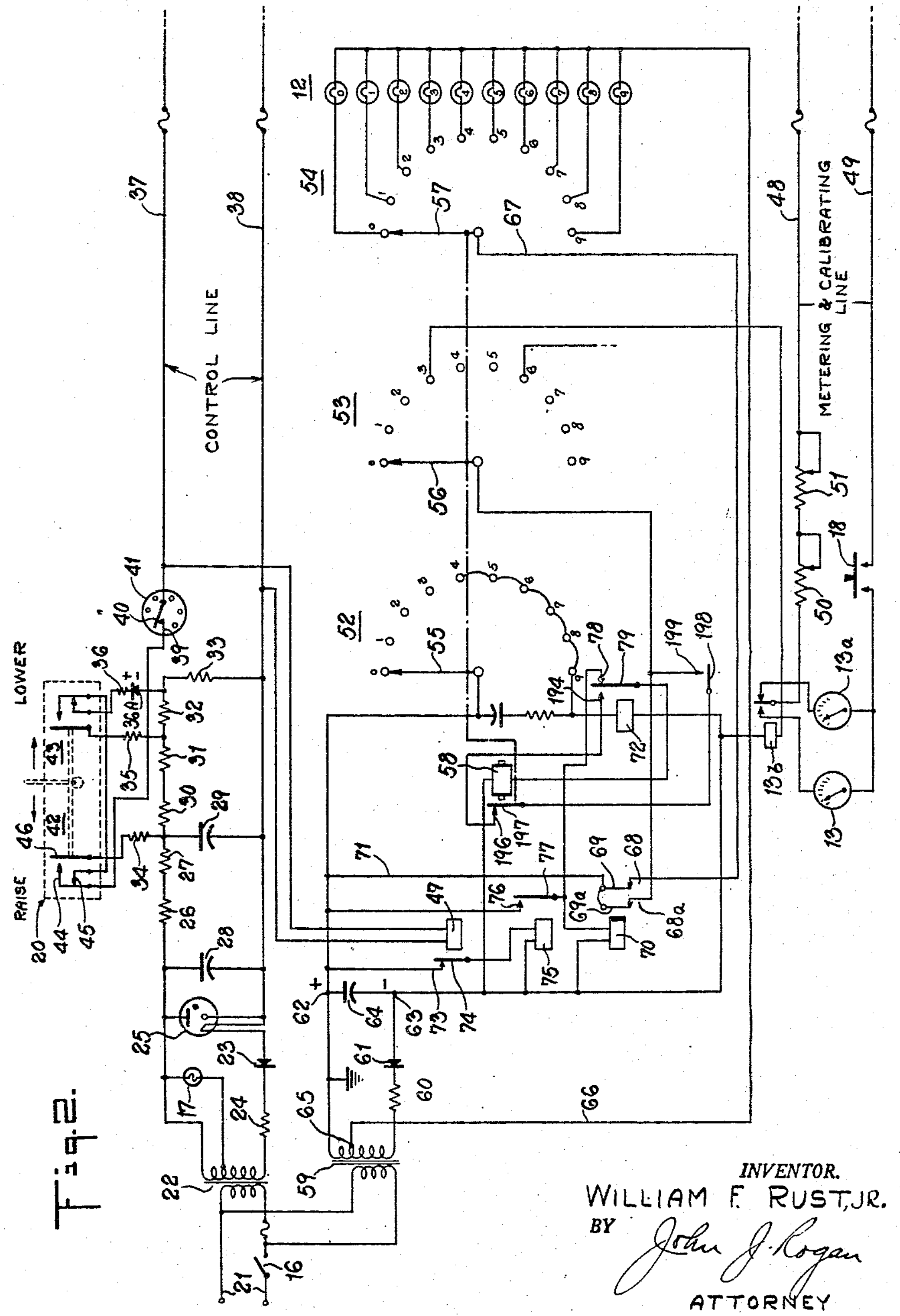
Fig. 2 is a schematic wiring diagram of the contral unit at the control point.

Referring to Fig. 2, when the line cord 21 is plugged into a suitable alternating current power supply outlet, and switch 16 is closed, electric power is applied through transformer 22 to a rectifier 23 and series resistor 24 to provide a rectified voltage. This rectified voltage is applied to any well-known voltage regulator tube 25 and the rectified output is then filtered, for example by the series resistors 26, 27, and shunt condensers 28, 29, to smooth out any undesired ripples. The filtered output is then applied to a voltage divider comprising resistors 30—33. Resistors 34, 35, 36, and rectifier 36A are provided to prevent switch 20 from momentarily short-circuiting the voltage divider while the make and break contacts of the switch are momentarily both in circuit. The rectifier 36A is so poled that in the normal position of switch 20, the current flows readily into the line through the rectifier, but during the momentary short-circuit condition noted, the current flow is in the direction in which the rectifier has high impedance. The output of the voltage divider is applied to the twin conductor telephone line 37, 38, in series with the normally closed interrupter contacts 39, 40, of a conventional automatic telephone dial 41.

The potential of the direct current which is applied to line 37, 38, will depend upon the selected position of the "raise-lower" switch 20. This switch comprises two switch units 42 and 43 with a double throw operating lever to operate either of the units. Each unit comprises a double contact break-before-break spring assembly. Thus, unit 42 comprises a pair of normally closed contacts 44, 45, the contact 44 being normally out of engagement with the contact 46. When unit 42 is operated, contacts 46, 44, first close on each other and further movement of the operating lever against contact 46 then disengages contact 45 from contact 44. The unit 43 is similarly constructed.

With both switch units in their normal or unoperated condition, line 37 is connected to the junction of 32 and 33, through 36. When switch unit 42 alone is operated, line 37 is connected to the junction of 27 and 30, through 34, and the voltage on line 37, 38 is 50 volts. A similar condition exists when unit 43 alone is operated. By using the particular wiring interconnections between the two make-before-break switch units, the normal voltage of 12 volts on line 37, 38, can therefore be selectively changed either to 25 volts or to 50 volts without interrupting the line continuity.

Bridged across the line 37, 38, beyond the dial 41 is the winding of a fast acting relay 47 which operates on 12 volts direct current and remains operated except when the dial contacts 39, 40, are opened during dialing. The purpose of relay 47 will be described hereinbelow. Merely for purposes of explanation, it will be assumed that the distant radio transmitter, part of which is shown in schematic form in Fig. 4, has ten separate units or elements whose voltages or positional settings are to be checked and, if necessary, adjusted. For this reason the control unit of Fig. 2 is shown as provided with ten numerical indicator lamps 12. It will be assumed that lamp #1 is lighted when the antenna current at the transmitter is to be checked; lamp #2 is lighted when the filament voltage of the transmitter tubes is to be checked; lamp #3 is to be lighted when the condition of the antenna tower lights is to be checked. The remaining numerical lamps are to be lighted when other functions or settings of the transmitter are to be checked. Lamp #0 is lighted when the system is automatically set to check the controls for standardizing or calibration.

In accordance with one feature of the invention each particular functional unit of the radio transmitter that is to be checked or adjusted, has a distinctive dialing number allotted thereto. For example, as noted above, the antenna current is identified by the numeral #1; filament voltage by the numeral #2; antenna tower lights by the numeral #3; and similarly for any remaining units of the transmitter. In order to select and to make adjustment of any desired unit of the transmitter, it is necessary not only to dial the distinctive number allotted to that unit but also to operate either one of the switch units 42, 43, which switch units are, of course, common to all the units of the transmitter. In order to enable the studio attendant to watch the effects of each selected adjustment as it is being made, there is provided a meter 13 which may be any well-known form of microammeter which receives a calibrated direct current back from the selected unit of the radio transmitter over another telephone line 48, 49. The circuit through meter 13 is controlled by the normally open push-button switch 18, and the meter calibrating potentiometer 50, controlled by knob 19 and line adjusting resistor 51.

For the purpose of providing the studio attendant with a positive visual indication of the particular transmitting unit that has been selected and is being checked, there is provided within the housing 10 (Fig. 1) an automatic seeking switch of the step-by-step kind comprising three sets 52, 53, 54, of circularly arranged, fixed or bank contacts with their respective rotary brushes 55, 56, 57, all of which brushes are ganged together as indicated by the dotted line and provided with the conventional stepping magnet 58.

For the purpose of supplying the necessary direct current voltages for the automatic switch the line cord 21 is connected through a separate transformer 59 whose secondary is connected through a resistor 60 and rectifier 61 to provide a rectified direct current across the points 62, 63, of the polarity as indicated. A suitable condenser 64 may be bridged across these points to smooth out any undesired voltage variations. The secondary of transformer 59 is provided with a low voltage tap 65 for providing the necessary lighting voltage for the selected one of the lamps 12. The particular lamp that is lighted will, of course, depend upon the setting of the brush 57. For example, in the drawing the stepping switch is shown in its #0 position wherein a circuit is closed from one end of the transformer secondary low voltage tap 65, conductor 66, #0 lamp, #0 terminal of bank 54, brush 57, conductor 67, normally closed contacts 68, 69 of relay 70, conductor 71, returning to the transformer terminal. For purposes of explanation, it will be assumed that only three of the ten units of the transmitter are arranged to be checked. Under that condition, the bank contacts 4—9 of bank 52 are strapped together by jumper wires and the #9 terminal is connected through the winding of a reset control relay 72 to the negative D. C. voltage point 63. Consequently, if the attendant at the studio operates the dial 41 corresponding to any of the numerals #1 to #3, the brushes 55, 56 and 57 will be stepped to the corresponding numbered contacts of their bank. If the attendant wishes to set the controls for standardizing or calibrating, any number between #4 and #0 is dialed. This has the effect of stepping the switch brushes to the #0 contact sets in each bank and causes the lighting of the #0 lamp.

Let it be assumed that the automatic switch has previously been set on its #0 contacts and that the attendant now wishes to check and adjust the transmitter filament voltage. Under that condition the dial 41 is manipulated to transmit two pulses. In response to the opening of the telephone line at the dial contacts 39 and 40, the relay 47 momentarily releases and closes a circuit traceable from the positive point 62 through the back contacts 73, 74, of relay 47, winding of relay 75 to the negative point 63. Relay 75 operates in this circuit. The operation of relay 75 closes a circuit from positive point 62 through contacts 76, 77, winding of slow-to-release relay 70 to the negative point 63. Relay 70 stays in its operated condition during the transmission of each complete train of dial pulses. As soon as relay 75 operates, it also closes a circuit from positive point 62 through contacts 76, 77, normally closed contacts 78, 79 of relay 72, winding of stepping magnet 58 to the negative point 63. Magnet 58 thus operates and steps the brushes 55, 56, 57 to the #1 bank contacts. As is well-known, in order to reduce sparking at the switch magnet contacts, a suitable condenser and resistance combination is employed. For purposes of simplicity in the drawing, certain of these spark suppression elements are omitted. At the termination of the first pulse the dial contacts 39, 40 reclose, relay 47 reoperates, and relay 75 releases, thus breaking the stepping magnet circuit. Immediately thereafter the #2 pulse from the dial, releases relay 47, and operates relay 75, and the stepping magnet 58 to step the brushes to the #2 bank contacts. At the end of the dialing, relay 47 remains permanently operated and relay 75 remains permanently released. After a short interval relay 70 also releases and prepares an automatic reset circuit for the rotary switch. The brushes 55, 56, and 57, thus remain on their #2 bank contacts. The release of relay 70 closes the above-described circuit through contacts 68, 69, brush 57 to the #2 lamp, thus giving a visual indication to the attendant that the #2 unit in the transmitter is being checked.

Figure 4:
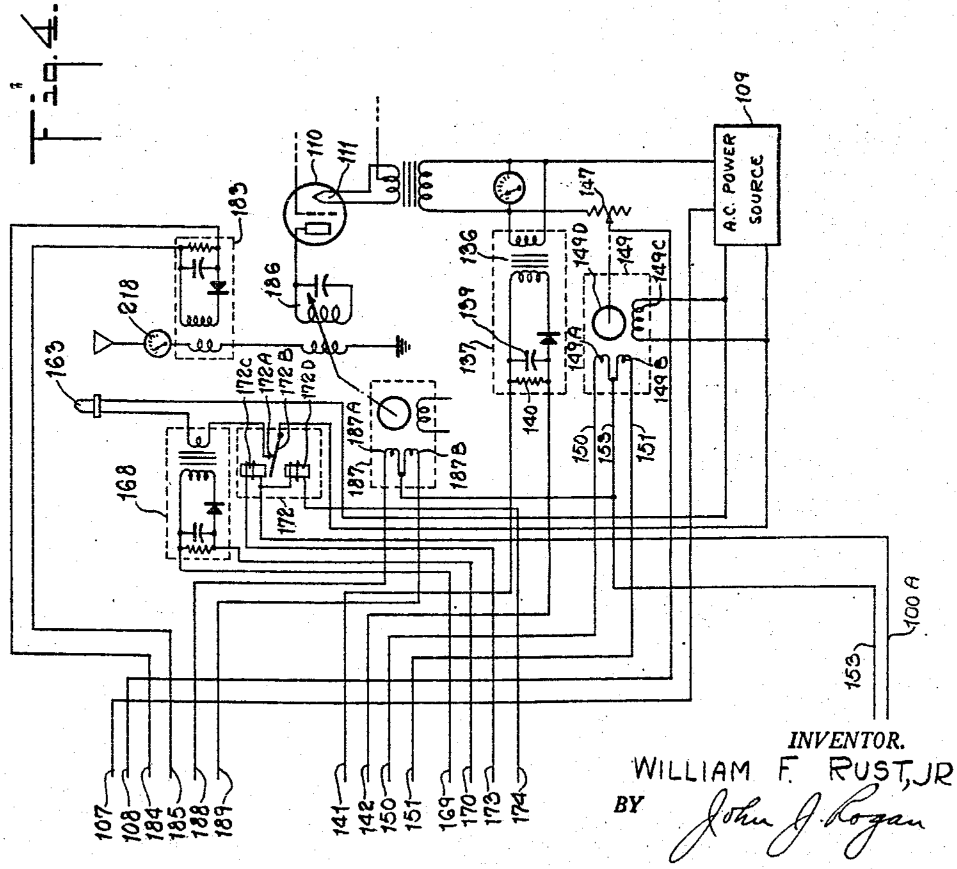
Fig. 4 is a schematic diagram of typical radio transmitter circuits in simplified form, to be controlled by the system of Figs. 2 and 3.
Figure 3:
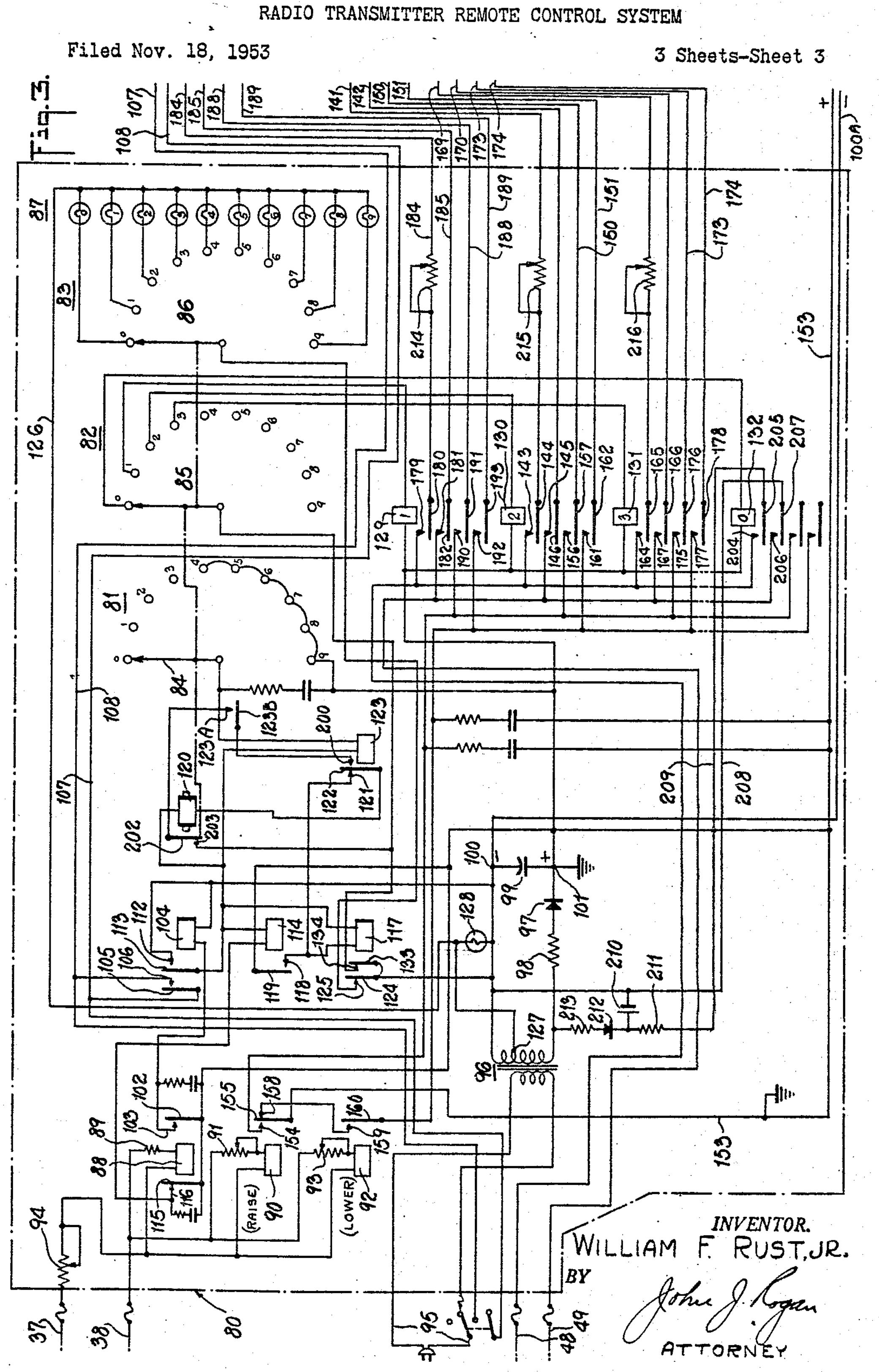
Fig. 3 is a schematic wiring diagram of the control equipment at the distant radio transmitter.

As shown in Fig. 3, the line 37, 38 terminates at the distant transmitter in a control unit 80 (Fig. 3) which may be enclosed either in a separate housing or it may be in the form of a unit adapted to be mounted in the control panel of the radio transmitter, parts of which are schematically shown in Fig. 4. Likewise, the metering line 48, 49, extends from the control unit of Fig. 2 to the unit 80 and thence through a selected one of ten relays #1—#0 allotted to the respective units of the transmitter to be checked. The unit 80 includes an automatic step-by-step seeking switch comprising three sets of stationary bank contacts 81, 82, 83, each bank having an associated rotary brush 84, 85, 86. The fixed contacts of bank 83 are connected to respective numerical indicator lamps 87.

The control line 37, 38, has bridged thereacross a relay 88 in series with a suitable resistor 89. Likewise, there is bridged across the incoming line 37, 38, the "raise" control relay 90 in series with the adjusting potentiometer 91. Similarly there is bridged across the incoming line 37, 38, the "lower" control relay 92 in series with its adjustable potentiometer 93. The line 37 may also include another adjusting potentiometer 94. The relay 88 is designed to operate when the voltage applied to the line 37, 38 at the control end, is 12 volts or higher. The relay 92 is designed to operate when the voltage applied to the line 37 at the control end, is 25 volts or higher, and the relay 90 is designed to operate when the voltage applied to line 37, 38 at the control end, is 50 volts or higher. Thus, as long as the normal 12 volt D. C. is applied to the line 37, 38, relay 88 remains operated.

For the purpose of supplying the necessary direct current potential for the automatic stepping switch and associated circuits there is provided a line cord 95, which can be plugged into a local 110 volt alternating current power supply. This alternating current supply is applied through a suitable transformer 96 in circuit with whose secondary there is provided a suitable rectifier 97, a series resistor 98 and a shunt condenser 99 to derive rectified direct current at the points 100, 101.

When the attendant at the control studio closes the switch 16 to apply the normal 12 volt D. C. potential to line 37, 38, relay 88 operates and in doing so closes a circuit from the positive point 101 through operated contacts 102, 103, winding of slow-to-release transmitter-control relay 104 back to the negative point 100. Relay 104 is designed so that it does not release after being initially energized unless contacts 102, 103, remain open for more than a predetermined time, for example two seconds. In other words, relay 104 stays operated during the transmission of the dialing pulses above described and remains operated so long as the 12 volt condition exists on line 37, 38. The contacts 105 and 106 of relay 104 control, over conductors 107, 108, the power supply circuit 109 (Fig. 4) which supplies heating current to the filaments of the various tubes in the transmitter. For simplicity in the drawing, only one of these tubes 110 with its filament 111 is shown in the drawing, it being understood, of course, that this is merely symbolic of the type of tubes that may be used in the transmitter.

From the foregoing it will be seen that the relay 88 responds to the impulses received from the dial 41. Upon the first release of the relay 88 in response to the first interruption of the line 37, 38, by the first dialed pulse, a circuit is closed from the negative point 100 through contacts 112, 113, of relay 104, winding of relay 114, contacts 115, 116 of relay 88, to the positive terminal 101. As soon as relay 114 is operated it closes a circuit from negative point 100 through contacts 112, 113, winding of slow-to-release relay 117, contacts 118, 119 to the positive terminal 101. Relay 117 being slow-to-release remains in its operated condition in the short intervals between successive dialed pulses, but at the end of the dialed train of pulses it releases. With the relay 14 operated in response to the first dialed pulse, a circuit is closed from the negative point 100 through contacts 112, 113, winding of switch stepping magnet 120, normally closed contacts 121, 122 of reset control relay 123, contacts 118, 119 of relay 114 to positive point 101. This steps the brushes 84, 85, 86 to their #1 position. At the cessation of the first dialed pulse, relay 88 reoperates and in doing so causes the release of relay 114 and the opening of the circuit to the stepping magnet. In response to the second dialed impulse, relay 88 again releases, reoperating relay 114 as well as the stepping magnet 120, thus moving the brushes 84, 85, 86 to their #2 position. At the end of the dialed train of two pulses, relay 117 releases. Since it has been assumed that the filament voltage is to be checked in position #2, and since the switch has now been stopped at that position, a circuit is closed from the upper end of the transformer secondary through the normally closed contacts 124, 125 of relay 117, brush 86, #2 contact in bank 83, #2 indicator lamp, conductor 126 and thence to the low voltage tap 127 on the transformer secondary. This #2 indicator lamp, therefore, lights and stays lighted. It should also be observed that there is an additional pilot light 128 permanently connected across the low voltage section of the transformer secondary, this power light remaining lighted to indicate the power is being supplied through the transformer 96.

Each of the terminals #0 to #9 in bank 82 of the automatic switch is connected to the winding of a corresponding one of nine function control relays. Merely for simplicity in the drawing, only four of these function control relays are shown. Thus, relay 129 is connected to the #1 contact in bank 82; relay 130 is connected to the #2 contact in bank 82; relay 131 is connected to the #3 contact in bank 82. The relay 132 has its winding connected to the #0 contact in bank 82. On the above assumption that the switch has been automatically moved to its #2 position, a circuit is closed from the negative point 100 through normally closed contacts 133, 134 of relay 117, brush 85, #2 bank contact, winding of relay 130, to the positive point 100. Relay 130 thus remains operated as long as the switch is in its #2 position.

Each of the function control relays has a set of four normally open contact sets. Two of these contact sets are arranged to connect the metering line 48, 49, to a corresponding pair of conductors leading to the corresponding transmitter unit to be checked. For example, since the filament voltage is being checked, the filament power supply 109 is coupled through a suitable transformer 136 to a rectifier filter unit 137 comprising, for example, the rectifier 138 and filter condenser 139 and resistor 140. Therefore, the D. C. voltage appearing on conductors 141, 142, will be proportional to the A. C. voltage supplied to the filaments in the transmitter tubes. The conductors 141, 142, are connected through the respective contacts 143, 144, 145, 146 of relay 130, and thence to the metering line conductors 48 and 49. The attendant at the control studio upon pressing button 18 causes the pointer of meter 13 to be deflected, indicating the amount of filament voltage that is being supplied to the tubes of the transmitter. The filament power supply 109 may be provided with a suitable adjusting member, for example a variable resistance or potentiometer 147 whose adjusting arm can be connected to the armature 148 of a suitable reversible motor 149. The motor 149 may be of the type whose direction of rotation can be controlled. For example, motor 149 may be of the well-known reversible shaded pole induction motor kind, having a pair of wound shading coils 149A, 149B, and a field coil 149C which field coil is continuously energized with alternating current from the source 109. The direction of rotation of the armature 149D of the motor will then be dependent upon which particular shading coil is short-circuited. A terminal of each of the shading coils is connected respectively to one of the conductors 150, 151, but a circuit over these conductors is not completed unless the corresponding function control relay 130 is operated. The common or neutral conductor 153 which is connected to the other terminals of each of the shading coils is connected to ground at the point 101. Therefore, by grounding either of the conductors 150 or 151, the corresponding direction of rotation of the motor can be effected.

If the meter 13 indicates that the filament voltage is at its normal or proper value no further adjusting operations are necessary. If however, the filament voltage is lower than its normal or proper voltage it is necessary to operate the motor 149 in such a direction as to turn the member 147 to raise the filament voltage. For this purpose the attendant at the studio operates the switch unit 42 which results in the application of 50 volts to the telephone line 37, 38. This voltage, therefore, results in the operation of relay 90. Thereupon a circuit is closed from the common grounded bus 153 through the contacts 154, 155, of relay 90, contacts 156, 157 of relay 130, conductor 150 to the corresponding terminal of the motor shading winding 149A of 149 which causes that motor to rotate in the proper direction to raise the filament voltage. While the motor is thus operating and the filament voltage is being adjusted, there is a corresponding variation in the direct current potential applied over conductors 141, 142, to the metering line 48, 49. Thus, the attendant at the studio can continuously watch the actual change in the filament voltage as the motor is operating. When the proper value has been arrived at, the attendant releases switch unit 42, which stops further operation of motor 149. On the other hand, if the filament voltage had been too high, the attendant operates switch unit 43, which causes 25 volts to be applied to the line 37, 38. This results in the operation of relay 92. A circuit is thereupon closed from the common bus 153 through contacts 155, 158 of relay 90, contacts 159, 160 of relay 92, contacts 161, 162 of relay 130, conductor 151, short-circuiting the shading winding 149B thus causing the motor 149 to operate in the proper direction to decrease the amount of filament voltage. Here again, the attendant at the studio is given a continuous indication on the meter 13 of the actual decrease in the filament voltage so that when the proper value is arrived at, switch unit 43 is released and the motor 149 stops.

If, for example, the studio attendant had desired to check the antenna tower lights represented schematically by the numeral 163, the numeral 3 would have been dialed. This dialing would result in the setting of brushes 55, 56, 57, on their #3 bank contacts, causing the #3 lamp of the set of lamps 12 at the control unit to remain lighted. It would also result in the setting of the brushes 84, 85, 86 at the transmitter end of the control line to be set on their #3 bank contacts. Brush 85 in its #3 position closes a circuit for relay 131, and brush 86 closes a circuit to light #3 lamp at the transmitter end of the control system. Relay 131 at its contacts 164—165, 166—167, connects the metering line 48, 49 and the meter 13 in circuit with the rectifier filter unit 168 by way of conductors 169, 170. The unit 168 is coupled to the circuit which supplies current to the tower lights 163. The attendant at the studio, therefore, by operating push button 18, can determine the condition of the tower lights. Thus, the power source circuit to the tower light 163 is controlled by an on-and-off switch 172 which has a pair of switch contacts 172A, 172B, and a corresponding pair of operating electromagnets 172C, 172D. The windings for the said magnets are connected to a common return conductor 100A, which is connected to the negative terminal 100 of the direct current supply (Fig. 3). The opposite terminal of each of the windings 172C, 172D, is connected respectively to one of the two conductors 173, 174, which in turn are connected through the contacts of the function relay 131 to the positive potential point 101. By observing the indication on the meter 13, the attendant can determine whether the tower light 163 is on or off and can also determine whether the tower light is receiving the proper amount of current. In order to turn the tower light off, the attendant operates the switch 20 to the "lower" position which results in the operation of relay 92. Under that condition, a circuit is traceable from the negative point 100 over conductor 100A, winding 172D, conductor 174, contacts 177, 178 of relay 131, contacts 159, 160 of relay 92, contacts 158, 155 of relay 90 to the positive point 101. This energizes winding 172D and opens the power supply to the tower light 163. The relay 172 is of the well-known latching type so that when the movable contact 172B is magnetically operated to either one of its two positions, it remains mechanically latched in that position until the other winding, for example winding 172C is energized. Under the above assumption therefore, the circuit to the tower light 163 remains open even after the attendant releases button 18. When it is desired to turn the tower light on, button 18 is again operated and the switch 20 is operated to its "raise" position, whereupon relay 90 is operated and a circuit is traceable from the negative point 100 over conductor 100A, winding 172C, conductor 173, contacts 176, 175, contacts 154, 155 of relay 90 to the positive point 101. The energization of winding 172C in this circuit operates the contact 172B to close the circuit from the power source through contact 172A, and the contact 172B remains mechanically latched in this circuit closed position.

In a similar manner, if the attendant at the studio desires to check the antenna loading, the numeral #1 would have been dialed, causing the setting of brushes 55, 56, 57 on their #1 contacts and the consequent lighting of lamp #1 at the studio control. Likewise brunches 84, 85 and 86 would be set on their #1 contacts lighting the #1 lamp at the transmitter end of the control line. Under this condition relay 129 is operated and at its contacts 179—180, 181—182, it connects the rectifier filter unit 183 in circuit with the metering line 48, 49, by way of conductors 184, 185. The unit 183 is coupled to the antenna circuit in such a way as to produce a direct current voltage indicative of the antenna current. The control element for the antenna current represented schematically by the numeral 186, thus is operated by a reversible motor 187 which may be similar to motor 137 and having respective shading windings 187A, 187B, which are selectively short-circuited over conductors 188, 189 and through contacts 190—191, 192, 193, to the contacts of relays 90 and 92.

If the antenna current is at its proper or assigned value, neither of the relays 90, 92, is operated because the attendant at the studio operates neither of the units 42, 43 and the motor 185 remains stationary. If the indication on the meter 13 shows that the antenna current should be raised the attendant operates switch unit 42 which operates relay 90 and completes a circuit through the contacts 154, 155 of relay 90, through contacts 190, 191, conductor 188 to cause the motor 187 to operate in the appropriate direction. If the antenna current is to be lowered, switch unit 43 is operated which causes operation of relay 92 and completes a circuit through contacts 159, 160, contacts 192, 193, conductor 189 to cause the motor 187 to rotate in the appropriate direction for lowering the antenna current.

In order that the meter 13 may be calibrated to represent standard conditions for the various units of the transmitter, the attendant at the studio dials the digit #0. Since it has been assumed for purposes of explanation that only three units of the transmitter are to be checked, the #4 to the #9 contacts in bank 52 of the automatic switch (Fig. 2) are strapped together. Likewise, the bank contacts #4 to #9 of bank 81 of the automatic switch at the opposite end of the control system (Fig. 3) are also strapped together. Therefore, when the attendant at the studio dials either the digit #0 or any of the digits #4 to #9, the automatic switches are stepped to their #0 position. For example, if the automatic switches had been last set or their #3 position and the studio attendant dials the digit #4, the fourth pulse from the dial 41 advances the brushes 55, 56, 57 and the brushes 84, 85 and 86 to their #4 position. As soon as brush 55 contacts the #4 terminal a self-stepping circuit is completed from the positive point 62 through brush 55, strapped terminals 4 to 9, winding of reset relay 72 to the negative point 63. Relay 72, when operated, closes a circuit from the negative point 63, winding of stepping magnet 58, contacts 79, 194, contacts 196, 197, off-normal contacts 198, 199 of the rotary switch, contacts 68, 69, to positive point 62. In this circuit the brushes are automatically stepped back to their #0 contact whereupon relay 72 releases and prevents further stepping of the brushes. It should be noted that contacts 198, 199, are the conventional off-normal contacts of the rotary switch which remain closed as long as the switch brushes are way from their #0 contacts, but which open when the said brushes are on their #0 contacts. Similarly, the brushes 84, 85 and 86, are automatically stepped back to their #0 contacts under control of the reset relay 123 and the switch off-normal contacts 123A, 123B. The normalizing circuit for the brushes 84, 85 and 86 is as follows, from the negative point 100, contacts 112, 113 of relay 104, winding of stepping magnet 120, contacts 121 and 200 of the reset relay 123, off-normal contacts 123B, 123A, contacts 202, 203 of the stepping magnet, contacts of relay 117 to the positive point 101.

With the switches set in their #0 position a circuit is closed through brush 85 and its #0 contact through the winding of relay 132. Relay 132 at its contacts 204—205, 206—207 connects a source of meter standardizing current over conductors 208, 209 to the metering line 48, 49. This source of standardizing current may comprise a standard battery 210 which is connected through a precision resistor 211 across the conductors 208, 209. The battery 210 may be kept at its standard voltage by a charging circuit including the rectifier 212 and resistance 213 bridged across the secondary of the transformer 96. Therefore, the attendant at the studio by operating button 18 can adjust the pointer of meter 13 to full scale deflection by appropriate adjustment of potentiometer 50. It should also be observed that at the transmitter end (Fig. 3) of the control system each of the D. C. metering conductors is connected in circuit with an appropriate adjusting potentiometer 214, 215, 216, etc., whereby the system can be adjusted to calibrate any desired deflection on the meter 13 with the normal settings of the various transmitter units. It will be understood, of course, that at the transmitter each of these units has its appropriate indicating meter such as the meters 217, 218, 219, which are standard equipment on most radio transmitters. By this means it is possible to calibrate the settings of these normal transmitter meters with the studio control meter 13.

It will be understood, of course, that this calibration need merely be done only at regular intervals. In order to effect the calibration an attendant is required at the transmitter to observe the readings of the standard meters at the transmitter, and the studio is connected with the transmitter station over a convenional telephone circuit so that the attendant at the radio transmitter can inform the attendant at the studio of the reading of the various instruments. Thereupon, the studio attendant can dial for the respective transmitter units, as above described, and direct the transmitter attendant how to adjust potentiometers 214, 215, 216, so that readings of meter 13 correspond with transmitter instrument readings. The manner in which the various meter potentiometers are used is as follows. Potentiometer 51 is preset to compensate for variations in line resistance at each particular installation so that full scale deflection of meter 13 is obtained with approximately one-half the resistance 50 inserted in the circuit. Thereafter, the adjusting arm for resistor 50 may be adjusted periodically with the system set in the calibrating position, to compensate for changes in line resistance with temperature and the like. With the correct setting of potentiometer 50, the various remote meter readings are adjusted to agree with the transmitter readings by means of potentiometers 214, 215, 216, etc.

Reference has been made hereinabove to the section 53 of the rotary switch at the control unit. The purpose of this section of the switch is to substitute for the meter 13 any other special meter which may be required for various settings of the system. For example, in position #3, it may be desired to substitute for the meter 13 another special meter 13A. For this purpose, the #3 contact in section 53 is connected to a relay 13B, so that when the #3 is dialed and the switch stops at its #3 position, a circuit is completed from the positive point 63 through contacts 69A, 68A of relay 70, brush 56 and its #3 contact, winding of relay 13B to the negative point 63. Relay 13B operates and substitutes for the meter 13 a special meter 13A. Similar special meters or other special devices may be wired into circuit by having the respective contacts in switch section 53 wired to relays similar to relay 13B.

It will be observed that the system is designed so as to be of the fail-safe type, so that the filament power for the tubes of the transmitter and, therefore, all of the transmitter power, is removed if at any time the control line 37, 38 is opened or shorted, or if there is any other major trouble that might result in loss of control. This is brought about by the slow-to-release relay 104 which controls the filament power circuit as above described. This relay releases if the line 37, 38 should become open-circuited or short-circuited for more than a predetermined time, for example two seconds.

While one particular embodiment has been described and illustrated herein, it will be understood that various changes and modifications can be made therein without departing from the spirit and scope of the invention. It will be understood, of course, that the system, as illustrated, using 10-point automatic seeking switches, is not limited thereto. For example, if more than 10 sections of a transmitter are to be checked, automatic switches with a corresponding number of bank contacts would be employed. Furthermore, the invention is not limited to the checking and adjusting of a radio transmitter, for example it may be desired to check and adjust various sections of a radio receiver, or it may be desired to check both units of a radio transmitter and units of a radio receiver, and the system lends itself easily adaptable to the checking and adjusting of both types of equipment. Under certain conditions it may be desirable to have the power supply for the transmitter completed independently of the control unit. For this purpose switch 95 (Fig. 3) is operated to its upper set of contacts whereby the conductors 107 and 108 are directly connected, independently of the operation of relay 104, thus completing the circuit from the alternating current power source 109 and enabling the transmitter to be operated independently of the control unit.

What is claimed is:

1. Apparatus for controlling a radio transmitter having a plurality of sections to be checked, comprising a first control unit located at a point remote from the transmitter, a second control unit at the transmitter, a control line extending between said units, an automatic seeking switch at the second control unit and having associated therewith a dial pulse relay responsive to dialed impulses transmitted over said line from the first unit to selectively set said seeking switch, each setting of said switch corresponding to a different section of the transmitter, a power supply for the transmitter, another relay at the second unit, circuit connections between said other relay and said power supply to control the application of power to said transmitter, and means to control said other relay over said line to disconnect the power supply from the transmitter whenever said line is abnormal to such an extent as to render the first unit ineffective to control the second unit.

2. Apparatus for controlling a radio transmitter having a plurality of sections to be checked, comprising a first control unit located at a point remote from the transmitter, a second control unit at the transmitter, a control line extending between said units, an automatic seeking switch at the second control unit and having associated therewith a dial pulse relay responsive to dialed impulses transmitted over said line from the first unit to selectively set said seeking switch, each setting of said switch corresponding to a different section of the transmitter, a filament power supply for said transmitter, another relay at the second unit, circuit connections between said other relay and said power supply to control the application of power to said transmitter, and means for automatically causing said other relay to disconnect the filament power supply from the power source transmitter whenever said control line is open-circuited or short-circuited.

3. Apparatus for controlling a radio transmitter having a plurality of sections to be checked, comprising a first control unit located at a point remote from the transmitter, a second control unit at the transmitter, a control line exending between said uints, an automatic seeking switch at the second control unit and having associated therewith a dial pulse relay responsive to dialed impulses transmitted over said line from the first unit to selectively set said seeking switch, each setting of said switch corresponding to a different section of the transmitter, a power supply for said transmitter, a quick-acting relay at said second unit bridged across said line and which remains operated except when said line is open-circuited or short-circuited, a fast-operating but slow-releasing relay controlled by said quick-acting relay, and means controlled by said slow-releasing relay to control said power supply for said transmitter.

4. Apparatus for controlling a radio transmitter having a plurality of sections to be checked, comprising a first control unit located at a point remote from the transmitter, a second control unit at the transmitter, a control line extending between said units, an automatic seeking switch at the second control unit and selectively set by dialed impulses transmitted over said line from the first unit to stop said switch in any desired one of a plurality of settings, each setting of said switch corresponding to a different section of the transmitter, a separate metering line extending between said units, and a single indicating meter connected to said separate metering line at the first unit and controlled from the second unit corresponding to the particular setting of said automatic switch for giving a continuous indication of the selected transmitter section as it is being checked and without changing the said particular setting of said switch.

5. Apparatus for controlling a radio transmitter having a plurality of sections to be checked, comprising a first control unit located at a point remote from the transmitter, a second control unit at the transmitter, a control line extending between said units, an automatic seeking switch at the second control unit and selectively set by dialed impulses transmitted over said line from the first unit to stop said switch in any desired one of a plurality of settings, each setting of said switch corresponding to a different section of the transmitter, a separate metering line extending between said units and common to all the transmitter sections, an indicating meter connected to said metering line at the first unit, a source of standard voltage at the second unit, and means responsive to one particular setting of said automatic switch for connecting said standard source to said metering line for calibrating said meter with respect to the desired normal conditions of said transmitter sections.

6. Apparatus for controlling a radio transmitter having a plurality of sections to be checked, comprising a first control unit located at a point remote from the transmitter, a second control unit at the transmitter, a direct current control line extending between both units, a separate direct current metering line also extending between both units, a step-by-step automatic seeking switch at the second unit, a source of direct current connected to said control line at the first unit, a manually operable impulsing dial connected in said control line for automatically setting said seeking switch to stop it at any desired one of a plurality of settings each of which corresponds to a particular transmitter section, said seeking switch having a series of bank contacts each allotted to a particular transmitter section, a plurality of multi-contact relays each connected to a corresponding one of said bank contacts, each relay having a set of contacts effective when operated to connect said metering line to a selected transmitter section, each transmitter section having means to produce a metering current whose magnitude represents the condition of said section, and a single meter connected to said line at the first unit for giving an attendant thereat a continuous indication of the condition of the particular transmitter section which has been selected for checking and without changing the particular selective setting of said switch.

7. Apparatus according to claim 6 in which said first unit has a step-by-step automatic seeking switch which is also selectively settable in unison with the step-by-step automatic seeking switch at the second unit, said first unit also including a set of indicator lamps one allotted to each of said transmitter sections, and circuit connections between the automatic switch in said first unit and said lamps to selectively illuminate a lamp in accordance with the setting of said switch and for maintaining the said lamp lighted as long as a selected transmitter section is being checked.

8. Apparatus according to claim 6 in which said automatic seeking switch at one setting connects a source of standardizing current at the second unit to said metering line.

9. Apparatus according to claim 6 in which each of said transmitter sections has an adjusting element, and each of said multi-contact relays has an additional set of contacts for connecting said control line to operate the adjusting element of the particular transmitter section selected by said automatic switch and for producing a variable indication on said meter simultaneously with the adjustment of said adjusting element.

10. Apparatus for controlling a radio set having a plurality of sections to be checked, comprising a first control unit located at a point remote from the set, a second control unit at the set, a direct current control line extending between said two units, a separate metering line extending between said units, a plurality of multi-contact relays at the second unit one for each of said sections of the set, an automatic seeking switch controlled by impulses dialed over said control line for selectively operating the particular one of said relays allotted to a particular section of said set which is to be checked, an adjusting element for each section of the set, means at each section of the set to derive a direct current metering voltage representing the condition of that section, circuit connections effective when any of said multi-contact relays is operated for thereby connecting said control line to the selected adjusting element, and for simultaneously connecting the said direct current metering voltage means at said section to said metering line to produce variable indications on said meter simultaneously with the adjustment of said adjusting element, and a calibrated meter associated with said metering line at said first unit.

11. Apparatus according to claim 10 having means at the first unit for normally applying direct current control voltage of one level to said control line to control said seeking switch, and manually operable switch means at said first unit for changing said direct current voltage selectively to two other different levels corresponding respectively to the direction in which the selected adjusting element is to be moved.

12. Apparatus according to claim 11 in which said manually operable switch means is connected to said line through a voltage dividing network to change said control voltages without interrupting the control line.

13. Apparatus for controlling a radio transmitter having a plurality of sections to be individually checked, comprising a first control unit located at a point remote from the transmitter, a second control unit at the transmitter, a control line extending between said units, an automatic seeking switch at the second control unit arranged to be selectively set by dialed impulses transmitted over said line from the first unit, each setting of said switch corresponding respectively to a different section of the transmitter, a plurality of indicator devices at the first unit each allotted to a corresponding one of said transmitter sections, and circuit connections including another automatic seeking switch controlled in unison with the first mentioned seeking switch for automatically selectively operating the particular indicating unit corresponding to the transmitter section selected by said seeking switch to give to an attendant at said first unit a continuous indication of the particular transmitter section which is selected for checking, and a meter connectable selectively to the desired transmitter section in accordance with the setting of the first switch to produce a continuous indication of the condition of the said transmitter section.

14. Apparatus for controlling a radio transmitter having a plurality of sections to be checked, comprising a first control unit located at a point remote from the transmitter, a second control unit at the transmitter, a control line extending between said units, an automatic step-by-step seeking switch in the first unit, an automatic step-by-step seeking switch in the second unit, each of said switches having a series of bank contacts each allotted to a particular transmitter section, circuit connections responsive to impulses dialed over said line from said first unit for simultaneously and synchronizing moving both said automatic switches to a setting corresponding to a desired transmitter section to be checked, a plurality of indicator devices at the first control unit one for each transmitter section, circuit connections for operating and maintaining operated the indicator device corresponding to the particular transmitter section which is selected for checking by said switches, and a single meter connectable selectively to the desired transmitter section through said automatic seeking switch in the second unit to produce a continuous indication of the condition of that section.

15. Apparatus for checking the operating conditions of a radio set having a plurality of sections to be individually checked, comprising a control unit located at a point remote from the set, a controlled unit connected to the set, a direct current control line extending between said units, means at said control unit to apply a direct current control voltage of normal level to said line, a device at the control unit for selectively increasing said normal voltage to two different but higher levels, a set of three relays at the controlled unit, the first of said relays responding as long as control voltage is received over said control line and corresponding to at least said normal level, the second of said relays responding only when the received control voltage corresponds to the first of said higher levels, the third relay responding only when the received control voltage corresponds to the second of said higher levels, a slow-to-release power supply guard relay for the radio set at the controlled unit, circuit connections for operating said guard relay in response to the operation of said first relay, an automatic seeking switch at the controlled unit, a stepping circuit for said seeking switch completed under control of the contacts of said first relay, a plurality of multi-contact function relays one for each section of the radio set to be checked, circuit connections for selectively operating a particular one of said multi-contact relays in accordance with the setting of said seeking switch, an adjusting element for each section of said radio set, means to move each adjusting element in either of two directions, circuit connections completed through contacts of the second relay and through said seeking switch and through the selected multi-contact relay to operate in one direction the adjusting element of the section of the radio set to be checked, and other circuit connections completed through contacts of the third of said relays and through said seeking switch and said selected multi-contact relay to operate in the other direction the said adjusting element of the section of the radio set to be checked.

16. Apparatus according to claim 15 in which said guard relay has contacts which control the power supply for said radio set, and said control line is provided with a line-interrupting numerical dial to control said stepping circuit without interrupting said power supply.

17. Apparatus according to claim 16 in which said guard relay automatically disconnects said power supply from said radio set if the control voltage on said line is below the normal value for a predetermined interval.

18. Apparatus according to claim 15 in which a separate metering and calibrating direct current line extends from the control unit to said multi-contact relays and each of said sections of the radio set is provided with a converter unit for deriving direct current metering voltages representing the operating condition of the respective section of the set, and circuit connections including a selected one of said multi-contact relays for completing a direct current circuit from said metering line to the selected converter unit at the selected section of said set.

19. Apparatus according to claim 15 in which a numerical dial and an automatic seeking switch and an associated stepping circuit are provided at the control unit, circuit connections controlled by said numerical dial for operating the seeking switch at the control unit and the seeking switch at the control unit in unison, a common direct current metering line extending between said control unit and said multi-contact relays, a plurality of calibrated meters connectable to said metering line at said control unit, said seeking switch at the control unit having means for automatically connecting a particular meter into circuit with said metering line in accordance with the selected setting of both said seeking switches.

20. In a remote control and metering system of the kind having a controlling station and a controlled station which latter station has a plurality of elements whose setting is to be checked and adjusted, a control line between the two stations, a separate metering line between the two stations, an automatic seeking switch at the controlling station, an automatic seeking switch at the controlled station, means at the controlling station to apply three different voltage levels to said line one of said levels being a dialing voltage level and the other two levels being adjustment levels for controlling the setting of a particular element selected at the controlled station, dial means at the controlling station to interrupt said control line and thereby to set both said seeking switches simultaneously and the connect said metering line to the particular element to be checked and adjusted, a meter at the controlling station connected to said metering line, and selectively operable means to apply either one of said two other voltage levels to said control line to remotely adjust the selected element from the controlling station and to produce a continuous indication on said meter as said element is being adjusted.

References Cited in the file of this patent

UNITED STATES PATENTS

| | | |
|---|---|---|
| 1,866,459 | Gebhard | July 5, 1932 |
| 1,965,393 | Schleicher et al. | July 3, 1934 |
| 2,014,518 | Beverage | Sept. 17, 1935 |
| 2,049,948 | Cushman et al. | Aug. 4, 1936 |
| 2,672,598 | Hornfeck et al. | Mar. 16, 1954 |